(12) United States Patent
Wang et al.

(10) Patent No.: US 7,882,086 B1
(45) Date of Patent: Feb. 1, 2011

(54) METHOD AND SYSTEM FOR PORTSET DATA MANAGEMENT

(75) Inventors: Fang Wang, San Jose, CA (US); Clifford J. Conklin, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 262 days.

(21) Appl. No.: 11/316,219

(22) Filed: Dec. 21, 2005

(51) Int. Cl.
*G06F 7/00* (2006.01)

(52) U.S. Cl. .................. 707/696; 707/830; 711/161; 711/162; 711/163; 711/164; 714/15

(58) Field of Classification Search .............. 707/200, 707/205; 711/200
See application file for complete search history.

(56) References Cited

U.S. PATENT DOCUMENTS

| | | | | |
|---|---|---|---|---|
| 5,535,399 A * | 7/1996 | Blitz et al. | .................. | 714/6 |
| 5,884,297 A * | 3/1999 | Noven | .................. | 370/395.3 |
| 6,874,074 B1 * | 3/2005 | Burton et al. | .............. | 711/170 |
| 7,177,647 B2 * | 2/2007 | Yamada et al. | .............. | 455/450 |
| 7,194,526 B2 | 3/2007 | Kanemitsu | | |
| 7,251,659 B1 * | 7/2007 | Fallis et al. | ................ | 707/100 |
| 2003/0154271 A1 * | 8/2003 | Baldwin et al. | ............ | 709/223 |
| 2003/0214956 A1 * | 11/2003 | Navada et al. | ............. | 370/401 |
| 2004/0054866 A1 | 3/2004 | Blumenau | | |
| 2004/0073671 A1 | 4/2004 | Maria | | |
| 2004/0162992 A1 | 8/2004 | Sami | | |
| 2005/0201386 A1 | 9/2005 | Thompson | | |
| 2006/0047907 A1 * | 3/2006 | Shiga et al. | ................ | 711/114 |
| 2006/0109850 A1 * | 5/2006 | Otani et al. | ............. | 370/395.2 |
| 2006/0161810 A1 | 7/2006 | Bao | | |
| 2006/0288044 A1 * | 12/2006 | Kashiwagi et al. | .......... | 707/200 |
| 2007/0005928 A1 * | 1/2007 | Trika et al. | .................. | 711/202 |

* cited by examiner

*Primary Examiner*—Tim T. Vo
*Assistant Examiner*—Anh Tai V Tran
(74) *Attorney, Agent, or Firm*—Blakely, Sokoloff, Taylor & Zafman LLP

(57) ABSTRACT

A system and method are provided to method and system for portset data management. The system comprises a mass storage device to store a list of portset records; a network drivers layer to receive a request to add a new portset record to a list of portset records; and a portset update component to process the request. A portset may include a set of ports that provides access to logical unit numbers (LUNs). When the system receives a request to add a new portset, the portset update component may determine an available common index for the new portset record, associate the new portset record with the available common index, and update in memory representation of the list of records with the new portset record. The new portset record is then stored at a location on disk associated with the available common index for the new portset record.

22 Claims, 9 Drawing Sheets

METHOD AND SYSTEM FOR PORTSET DATA MANAGEMENT

FIELD OF THE INVENTION

At least one embodiment of the present invention pertains to storage systems and, more particularly to method and system for portset data management.

BACKGROUND

A storage system typically comprises one or more storage devices into which information may be entered, and from which information may be obtained, as desired. The storage system may be implemented in accordance with a variety of storage architectures including, but not limited to, a network-attached storage environment, a storage area network, and a disk assembly directly attached to a client or host computer.

The storage operating system of the storage system may implement a high-level module, such as a file system, to logically organize the information stored on the disks as a hierarchical structure of directories, files, and blocks. A hierarchical structure of blocks on disks may be exported to host computers (hosts) as named logical unit numbers (LUNs).

Some storage systems provide a mechanism to allow or deny a host computer access to a particular LUN based on the settings specified by the administrator. For example, visibility of LUNs to a particular host may be restricted to a subset of storage server's communications ports. A storage server administrator may create for a user an initiator group (an igroup) comprising one or more host computers so that the user is expected to access the storage server only via the designated hosts. All hosts that are members of an igroup may be restricted to a subset of storage server's communications ports if the igroup is bound to a portset that has one or more port members. Conversely, a host may have access to a storage server via a particular server's communications port by virtue of being a member of a particular igroup if the igroup is bound to a portset that has the particular port as a member.

In order to indicate the LUNs to which the members of a particular igroup have access, an igroup may be mapped to one or more of such LUNs. An administrator may further define a set of ports and bind it to a selected igroup to indicate which ports may be used by the members of the igroups in order to access the LUNs.

In some existing systems, the storage server may be configured such that portset information persist through storage server reboot or power loss. Consequently, portset information, such as a portset metafile, is being stored on a mass storage device (e.g., on disk) each time a portset record is added or updated to a data structure storing portset information. Portset data is retrieved from disk each time the storage server is powered up or rebooted. In a clustered file system, portset data is retrieved from disk each time takeover or giveback occurs. In order to use the portset information when an initiator's access to a target LUN needs to be qualified, portset information is maintained in memory (or in core), in addition to being stored on disk. The portset information that is being stored in memory may be managed by a storage server administrator. Management operations may include, for example, adding a new portset or deleting an existing portset.

Each time an administrator alters portset information, both the in memory and on disk portset data must be updated. In some existing systems, on disk portset metafile uses an array data representation, where each record is associated with a unique index. When a portset is deleted, the index associated with the old record is invalidated. When a new portset is added, a new index is created in the portset metafile. However, an approach where a new index is created each time a new portset is added, may result in memory holes (e.g., after a portset has been deleted that has an index value that is less than the highest index value for the portset records).

Another existing technique to manage portset data comprises maintaining a separate index structure for in memory portset data stored in memory, a separate index structure for on disk portset data, and a mapping between the two separate index structures. When an administrator deletes an existing portset or creates a new portset, the portset data on the disk is first located and changed. Then the index number associated with the on disk portset update is determined, a corresponding index number associated with the in memory portset update is calculated, and, finally, in memory data is populated with the updated portset information. This approach, however, may result in excessive disk read and write operations, which, in turn, may result in decreased performance.

SUMMARY

A system and method for portset data management are described. The system comprises a mass storage device to store a list of portset records; a network driver layer to receive a request to add a new portset record to a list of portset records; and a portset update component to process the request. A portset may include a set of ports that provides access to logical unit numbers (LUNs). When the system receives a request to add a new portset, the portset update component may determine an available common index for the new portset record, associate the new portset record with the available common index, and update in memory representation of the list of records with the new portset record. The new portset record is then stored at a location on disk associated with the available common index for the new portset record.

Other aspects of the invention will be apparent from the accompanying figures and from the detailed description that follows.

BRIEF DESCRIPTION OF THE DRAWINGS

One or more embodiments of the present invention are illustrated by way of example and not limited to the figures of the accompanying drawings, in which like references indicate similar elements and in which.

DETAILED DESCRIPTION

Figure 1A:
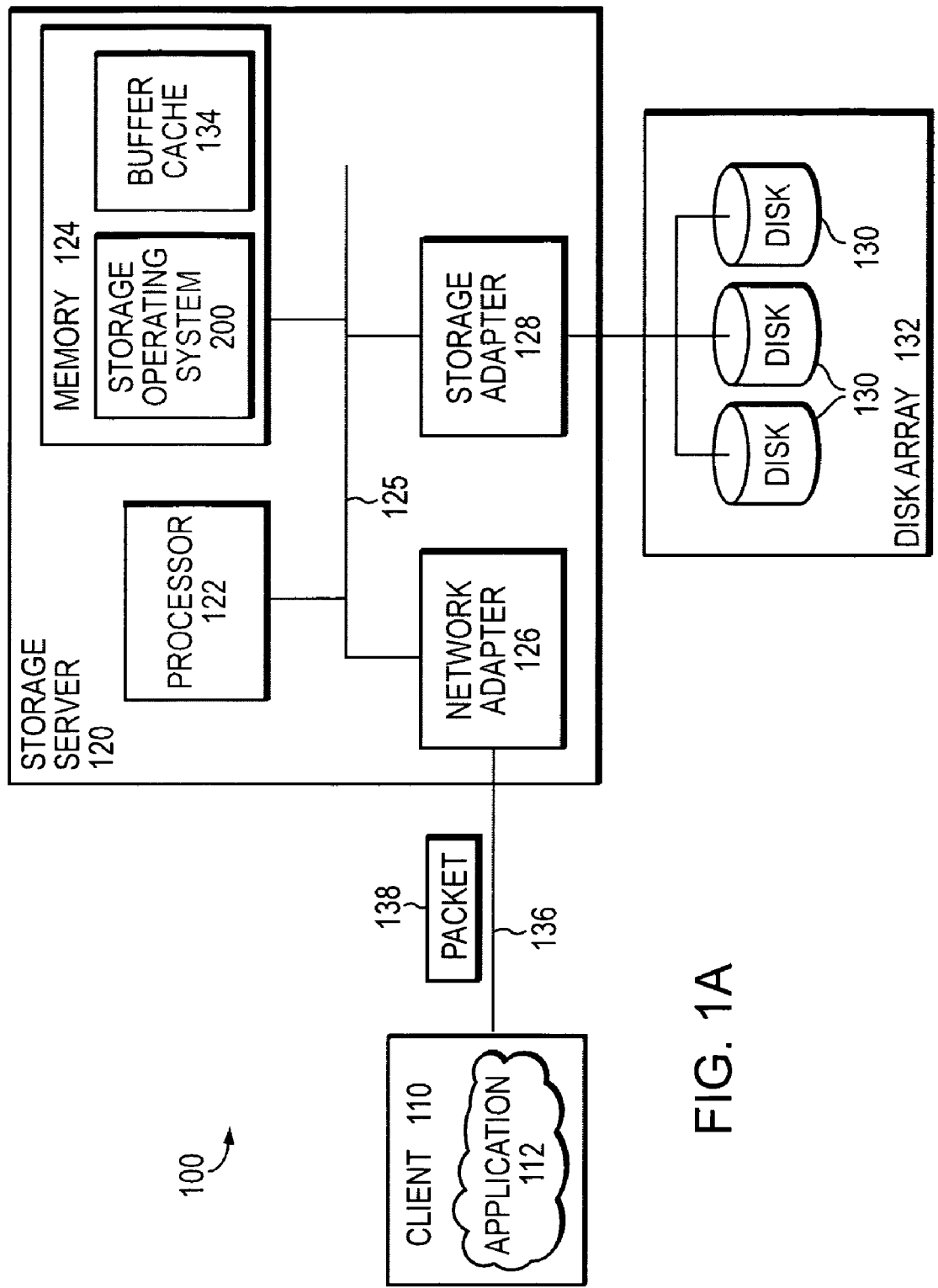
FIG. 1A is a schematic block diagram of an environment including a storage system that may be used with one embodiment of the present invention.

As described in detail below, the technique introduced herein addresses problems associated with the need to maintain synchronization of in memory and on disk representation of portset data in an efficient manner. In one embodiment of the present invention, indexes of those portset records that have been removed from the list of portset records may be automatically reused when a new portset record is being created. In one embodiment, a common index structure for both portset records in memory and portset records on disk may be maintained. Utilizing a common index structure may result in a more efficient synchronization process. For example, determining the index value for in memory representation of a portset record may allow storing this portset record on disk in the portset records database at the location associated with the previously determined index value. Thus, no additional operations may be necessary in order to determine the location of the corresponding portset record on disk.

When a portset record is removed from in memory representation of portset data, the removed portset record leaves a hole in the associated linear index structure. For example, a list of portset records may comprise ten portset records having ten consecutive associated indexes. If the fifth portset record is removed from the list, the indexes associated with the remaining nine records would no longer be consecutive. If portset records are being added and removed in this fashion, then the resulting list of portset records may eventually have multiple holes, which may result in less efficient use of memory and storage space. In order to address this issue, in one embodiment of the present invention, indexes of those portset records that have been removed are being reused each time when a new portset record is added. Thus, continuing with the example above, if the fifth portset record has been removed, then the next new record would be placed in the position of the previously removed fifth portset record. The indexes associated with portset records that have been removed are thus being used more efficiently, which may result in more efficient use of memory and storage space. In one embodiment, if there are no indexes to reuse (e.g., when no portset records have been deleted from the list of portset records), a new portset record with a new associated index may be created both in memory and on disk.

As mentioned above, when portset records are being removed from memory, the on disk representation of portset data is also being updated. In one embodiment, when a portset record is removed from in memory representation of portset records, a corresponding portset record stored on disk may be marked as INVALID. In one embodiment, portset records that are marked as INVALID are not being loaded into memory when the storage server is being powered up or rebooted.

In order to maintain a common index structure for both portset records in memory and portset records on disk, in one embodiment of the present invention, the storage operating system may implement two dedicated data queues associated with portset data. The first queue (the active portsets queue) may be used to track all active portsets. Active portsets may be marked with a VALID or ACTIVE flag in the on disk data records. The second data queue (the deleted portsets queue) may be used to keep track of those portset records that are no longer in use, but have a valid indexing number. Deleted portsets may be marked with an INVALID flag in the on disk data records.

When an administrator creates a new portset, in one illustrative embodiment, a portset update component of the storage system first determines whether there are any records stored in the deleted portset queue. If the deleted portsets queue has a portset record associated with a previously deleted portset, this record is removed from the deleted portsets queue and added to the active portsets queue. Thus, the previously deleted portset becomes a new portset, and the indexing number that was associated with the previously deleted portset becomes associated with the new portset. If the deleted portsets queue does not store any records, the portset update component of the storage system may create a new portset record by generating a new indexing number (e.g., by incrementing the current maximum index number by one) and add the new portset record to the active portset queue.

After the new portset record is added into the active portset queue, the portset update component determines the on disk location of the newly added portset record via the common index structure and updates the associated on disk portset data. Thus, the in memory representation of portset information and the on disk representation of portset information remain synchronized.

When an administrator issues a command to delete an existing portset, the corresponding portset record is removed from the active portsets queue, and added into the deleted portsets queue. After the record is removed from the active portsets queue, this record can be located on disk via the common index and the corresponding on disk data record may be updated by marking the record as INVALID.

In one embodiment, both the active portsets queue and the deleted portsets queue are populated from the on disk metafile when the storage server is being booted. It will be noted, that the technique of updating records in memory and on disk is not limited to updating portset information, and may be utilized with respect to any dynamic data structures. A dynamic data structure is a collection of data than can grow by allocating memory and shrink by reallocating memory during execution of a program (e.g., a linked list, a binary tree, etc.).

In one embodiment, the present invention may be implemented in the context of a storage-oriented network, i.e., a network that includes one or more storage servers that store and retrieve data on behalf of one or more clients. Such a network may be used, for example, to provide multiple users with access to shared data or to backup mission critical data. An example of such a network is illustrated in FIG. 1A.

FIG. 1A is a schematic block diagram of an environment 100 including a storage server 120 that may be advantageously used with one embodiment of the present invention. The storage server provides storage services relating to the organization of information on storage devices, such as disks 130 of a disk array 132. The storage server 120 comprises a processor 122, a memory 124, a network adapter 126, and a storage adapter 128 interconnected by a server bus 125. The storage server 120 also includes a storage operating system 200 that preferably implements a high-level module, such as a file system, to logically organize the information as a hierarchical structure of directories, files, and blocks on the disks.

As used herein, the term "storage operating system" generally refers to the computer-executable code operable on a computer that manages data access and may implement file system semantics, such as the Data ONTAP® storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications.

In the illustrative embodiment, the memory 124 comprises storage locations that are addressable by the processor and adapters for storing software program code. A portion of the memory may be further organized as a "buffer cache" 134 for storing certain data structures. For example, in one embodiment, data associated with committed writes is stored in the buffer cache 134 prior to being written to the target persistent storage device. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage server. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage server 120 to a client 110 over a computer network 136, which may comprise a point-to-point connection or a shared medium, such as a local area network. Illustratively, the computer network 136 may be embodied as an Ethernet network or a Fibre Channel (FC) network. The client 110 may communicate with the storage server over network 136 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage server 120 in accordance with a client/server model of information delivery. That is, the client may request the services of the storage server, and the server may return the results of the services requested by the client by exchanging packets 138 over the network, 136. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as iSCSI and FCP, when accessing information in the form of blocks.

The storage adapter 128 cooperates with the storage operating system 200 executing on the system 120 to access information requested by a host (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 132. The storage adapter includes input/output (110) interface circuitry that couples to the disks over an I/O interconnect arrangement, such as a conventional high-performance, FC serial link topology.

Storage of information on array 132 may be implemented as one or more storage "volumes" that comprise a collection of physical storage disks 130 cooperating to define an overall logical arrangement of (virtual block number) vbn space on the volume(s). Each logical volume is generally, although not necessarily, associated with its own file system. The disks within a logical volume/file system are typically organized as one or more groups, wherein each group may be operated as a RAID. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it will be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on disk" file may be implemented as a set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (LUNs).

Figure 1B:
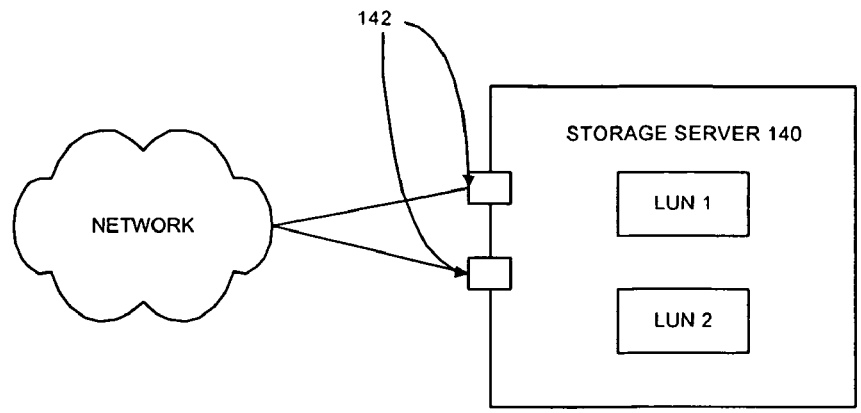
FIG. 1B is a schematic block diagram of a single storage server connected to a network that may be used with one embodiment of the present invention.
Figure 1C:
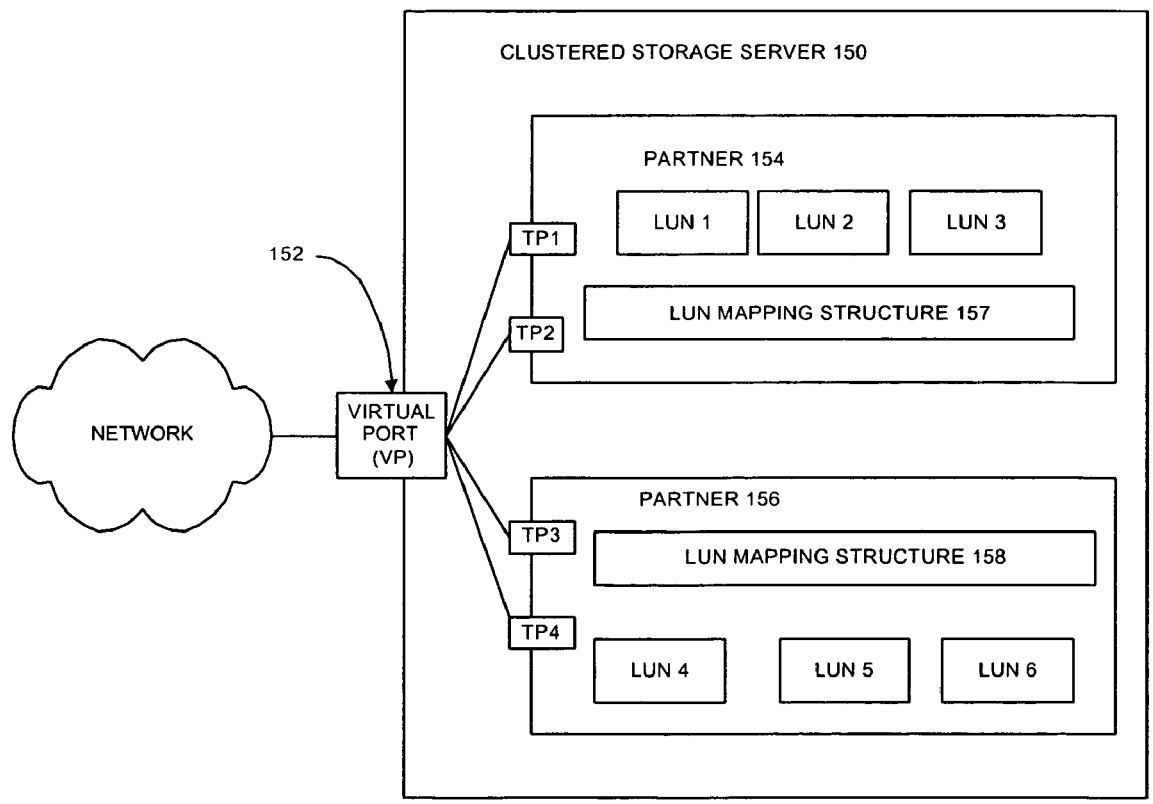
FIG. 1C is a schematic block diagram of a clustered storage server connected to a network that may be used with one embodiment of the present invention.

FIG. 1B illustrates a single storage server 140 connected to a network via communications ports 142. The storage server 140 provides access to hierarchical structures of blocks LUN 1 and LUN 2. FIG. 1C illustrates a clustered storage server 150 connected to the network via a virtual communications port 152. A clustered storage server may comprise a pair of partner servers such as a partner 154 and a partner 156. In the clustered storage server 150, the partner server 154 has an associated LUN mapping structure (LMS) 157, and the partner server 156 has an associated LMS 158. The partner servers 154 and 156 may have access to each other's LUN mapping structures in the event of a failover. The partner 154 is illustrated as having communications ports TP1 and TP2. The partner 154 provides access to LUN1, LUN2, and LUN3. The partner 156 has communications ports TP3 and TP4 and provides access to LUN4, LUN5, and LUN6. A clustered storage server, such as the server 150, appears to users as a single storage server. Each partner server on a clustered storage server may be running a storage operating system.

Figure 2:
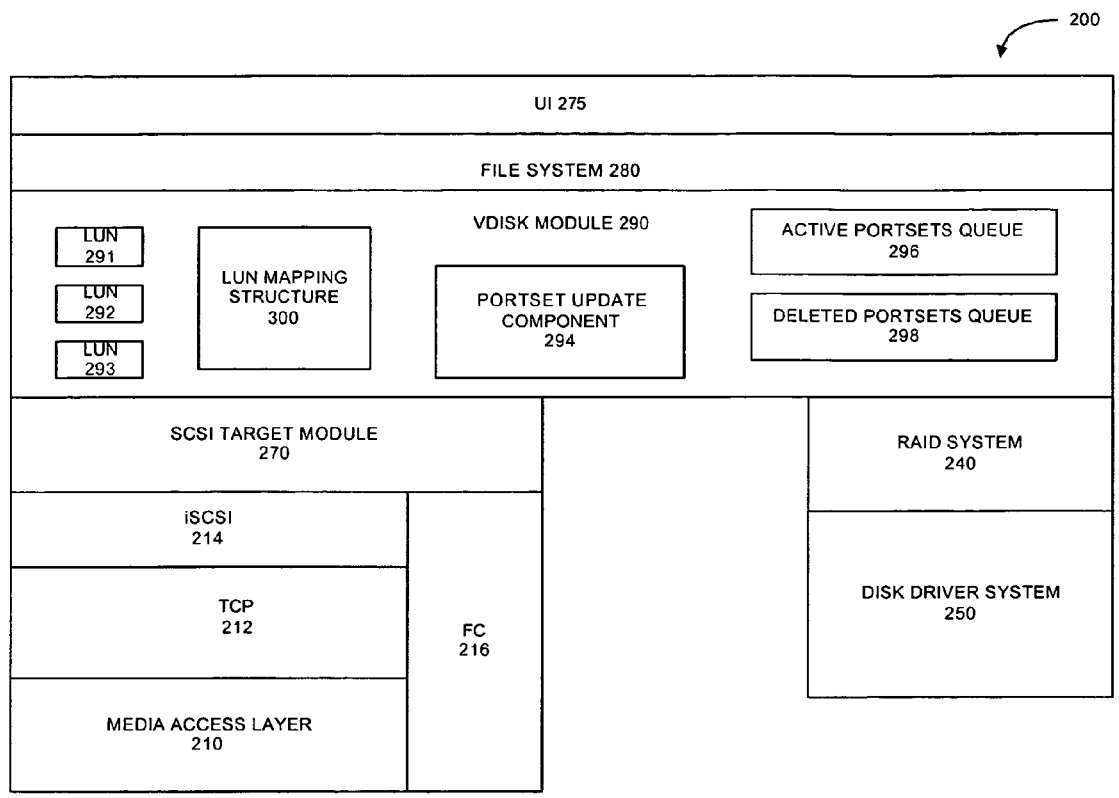
FIG. 2 is a schematic block diagram of a storage operating system that may be used with one embodiment of the present invention.

FIG. 2 is a schematic block diagram of a storage operating system 200 that may be advantageously used with one embodiment of the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the TCP layer 212.

An iSCSI driver layer 214 provides block protocol access over the TCP/IP network protocol layers, while a Fibre Channel (FC) driver layer 216 receives and transmits block access requests and responses to and from the storage system. The FC and iSCSI drivers provide FC-specific and iSCSI-specific access control to the blocks and, thus, manage exports of LUNs to either iSCSI or FCP or, alternatively, to both iSCSI and FCP when accessing the blocks on the storage system. The media access layer 210 and the FC driver layer 216 may be collectively referred to as a network drivers layer.

In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The vdisk module 290, in one embodiment, may include one or more LUNs, such as LUN 291, LUN 292, and LUN 293, and a LUN mapping structure (LMS) 300 to store access control information with regard to LUNs. For example, the LMS 300 may contain information specifying which users are permitted to access a particular LUN, as well as whether users with access to a particular LUN are permitted access from a particular host via a particular communications port. A host that communicates with a storage system via FC protocol (FCP) may be referred to as an FCP host. In one embodiment, if a host (e.g., an FCP host) is allowed access to a LUN on a storage server by virtue of being a member of a particular correct initiator group (an igroup), the host must also connect to the storage server via the correct FCP port in order to gain access to the LUN.

According to one embodiment of the present invention, the vdisk module 290 further comprises a portset update component 294 and two queues: an active portsets queue 296 and a deleted portsets queue 298. When the storage operating system 200 receives a request issued by an administrator to add a new portset, the portset update component 294 may identify an available common index for the new portset record, associate the new portset record with the available common index, and update in memory representation of the list of records with the new portset record. Specifically, the portset update component 294 determines whether there are any records in the deleted portsets queue 298. The deleted portsets queue 298 is populated with those portset records that have been indicated as deleted by the administrator, but that still have an index value that can be reused for a new portset record.

If a record is found in the deleted portsets queue 298, the portset update component 294 determines an index value associated with this record and reuses the index value associated with this record for the new portset record. The portset update component 294 then adds the new portset record into the active portset records queue 296. The record associated with the reused index value is deleted from the deleted portset records queue 298. The new record is then stored on disk, utilizing the disk driver system 250, at a location associated with the reused index value.

For clustered storage servers, such as the storage server 150 of FIG. 1B, in one embodiment of the present invention, each one of the local server and a partner server of the clustered storage server maintains both an active portsets queue and a deleted portsets queue.

Returning to FIG. 2, the SCSI target module 270 is disposed to provide a translation layer of the virtualization system between the block (LUN) space and the file system space, where LUNs are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as minoring and/or parity (RAID). The file system 280 illustratively implements a write anywhere file system having an on disk format representation that is block-based using, e.g., 4 kilobyte (kB) blocks and using index nodes ("modes") to identify files and file attributes (such as creation time, access permissions, size and block location). The file system uses files to store metadata describing the layout of its file system; these metadata files include, among others, an Mode file. A file handle, i.e., an identifier that includes an Mode number, is used to retrieve an mode from disk.

Figure 3:
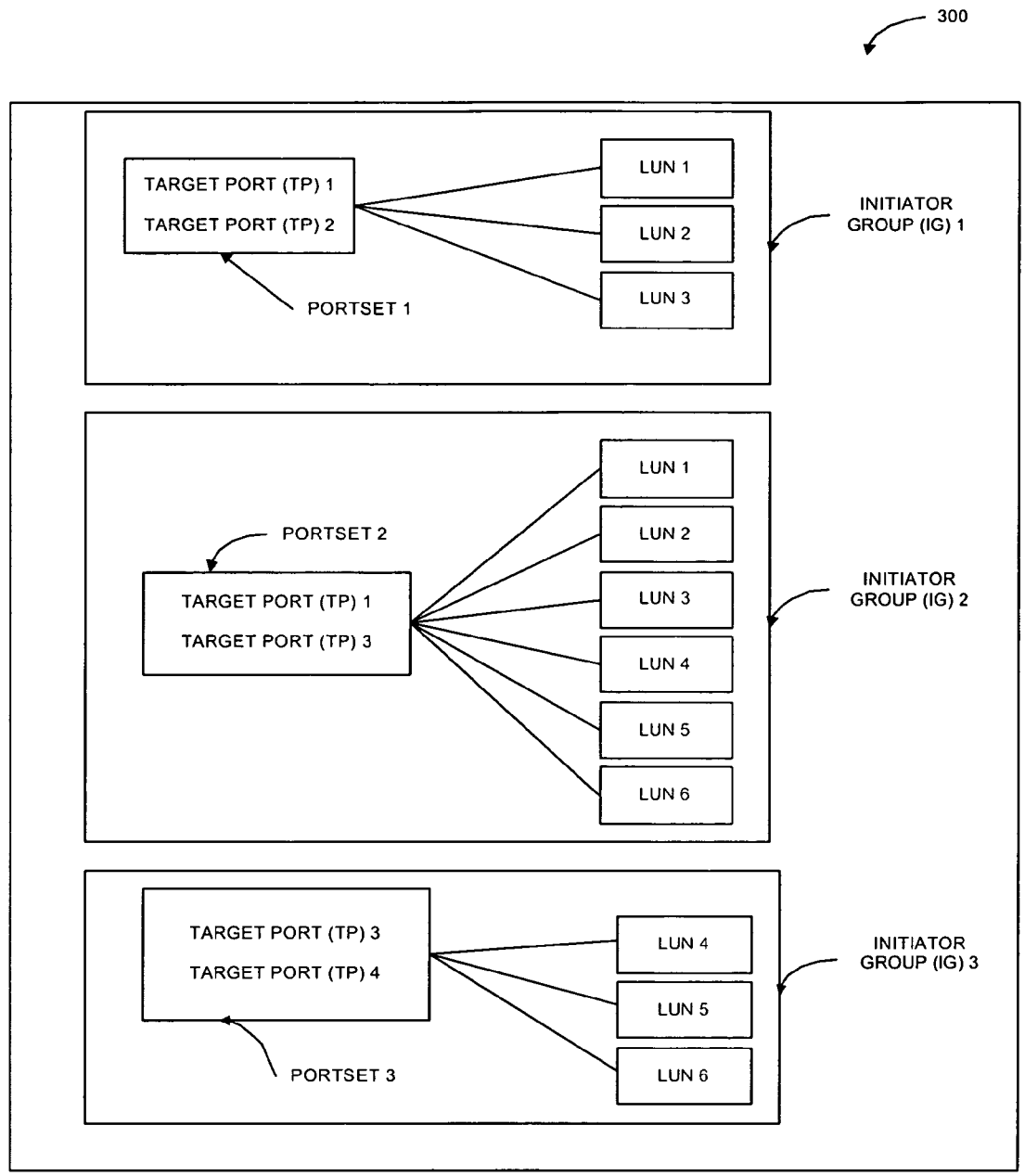
FIG. 3 is a schematic block diagram of a LUN mapping structure, according to one embodiment of the present invention.

The LUN mapping structure 300, illustrated in FIG. 3, in one embodiment, stores mapping information for initiator groups (igroups) as well as for ports that are bound to initiator groups. For example, as shown in FIG. 3, initiator group IG1 is mapped to LUN1, LUN2, and LUN3 and is bound to a portset 1 consisting of target port TP1 and target port TP2. Initiator group IG2 is mapped to LUN1, LUN2, LUN3, LUN4, LUN5, and LUN6 and bound to target ports TP1 and TP3 (a portset 2). Initiator group IG3 is mapped to LUN4, LUN5, and LUN6 and can access these LUNs via target ports TP3 and TP4 (a portset 3). It will be noted that data relating to LUN mapping may be stored separately for each initiator group as well as for each target port on the server. Alternatively, data relating to LUN mapping may be stored for each host.

Utilizing the example of FIG. 3, it should be noted that a host who is a member just of IG1 has access to LUN 1, LUN 2, and LUN 3 only through ports TP1 and TP2. If the same host is a member of both groups IG1 and IG2, that member has access to LUN 1, LUN 2, and LUN 3 via ports TP1 and TP2 by virtue of being a member of group IG1, and also via port TP3 by virtue of being a member of group IG2.

Similarly, if a host is a member of only group IG2, that member has access to LUN 1-LUN 6 only via ports TP1 and TP3 of the storage server. If, on the other hand, the host is a member of both groups IG2 and IG3, that member has access to LUN 1-LUN 3 only via ports TP1 and TP3, but to LUN4-LUN 6 via target ports TP1, TP3, as well as via port TP4 by virtue of being a member of group IG3.

In one embodiment, a LUN mapping structure may be created for each host and pushed (e.g., utilizing a communications protocol) to the host (e.g., the client 110 of FIG. 1) when the storage server detects that the host has logged in. The storage server may detect that the host has logged in by receiving a log in request from the host. The LUN mapping structure for the host determines which LUNS are made visible to the host when the host logs in.

In one embodiment, information stored in the LUN mapping structure 300 corresponds to access control settings for LUNs specified by a storage system administrator, e.g., by utilizing a command line interface (CLI) or a graphical user interface (GUI). In one embodiment, a "portset" command may be provided with the storage server's CLI that allows an administrator to create, modify, and remove portsets.

For each host that has access to the storage server, the storage server generates an associated LUN map indicating those LUNs to which the host has access. The associated LUN map for the host is generated based on the host's igroup membership and on the portsets bound to groups of which the host is a member. When a host logs out (e.g., logs out of a domain of which the relevant storage server is a member) or is removed from an igroup, the LUN map for the host is updated by recalculating the number of mapped LUNs for the host and modifying host's LUN mapping structure accordingly for every igroup in which the host is a member. When an administrator binds a portset to an igroup or unbinds a portset from the igroup, the LUN mapping structure is updated by iterating over all the hosts in the igroup and rebuilding an associated LUN map for each host. The vdisk module 290 may be configured to update the LUN mapping structure responsive to detecting a change in the host's initiator group membership. In one embodiment, a CLI command may be provided to permit an administrator to modify the host's initiator group membership.

Figure 4A:
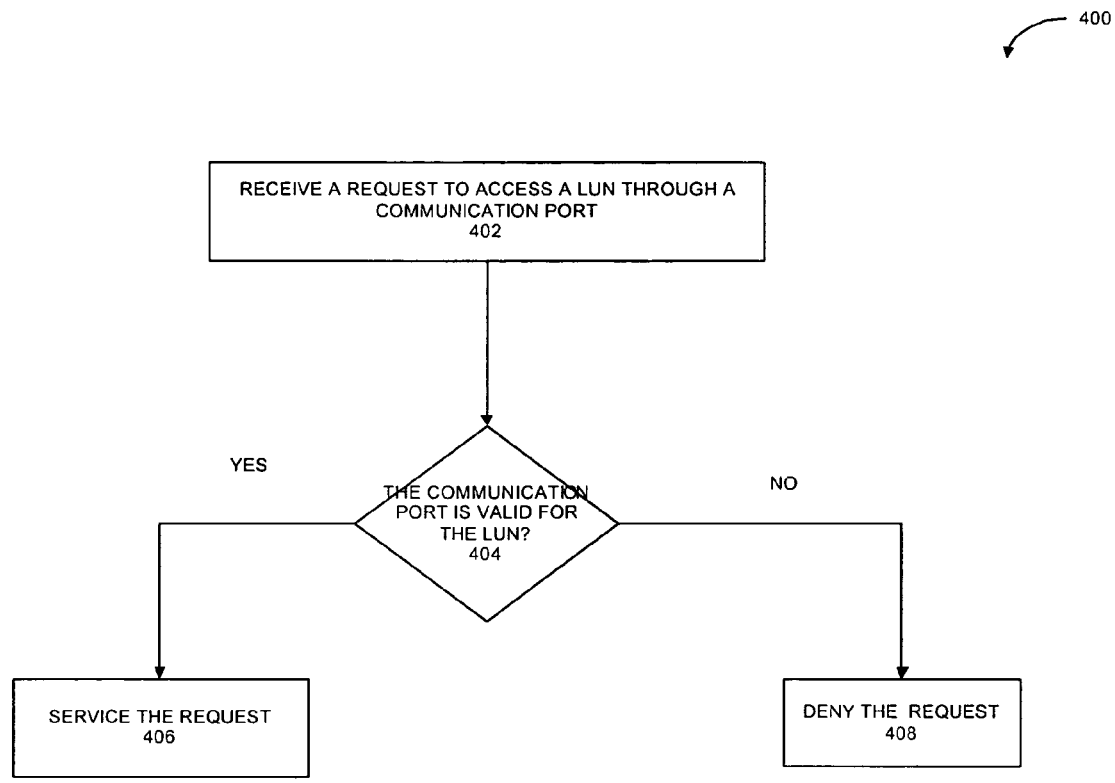
FIG. 4A is a flow chart illustrating a method to provide communications port access control for LUNs, according to one embodiment the present invention.

FIG. 4A is a flow diagram illustrating a method 400 to control access to LUNs utilizing communications port information. The method 400 may be performed by processing logic that may comprise hardware (e.g., dedicated logic, programmable logic, microcode, etc.), software (such as run on a general purpose computer system or a dedicated machine), or a combination of both.

At operation 402, a request to access a LUN through a communications port is received at the storage server. At operation 404, it is determined whether the communications port is a valid port for the host to access the target LUN. If the communications port is a member of a portset that is bound to any of the igroups of which the requesting host is a member, then the communications port is a valid port. If the communications port is not a member of any portset that is bound to any of the igroups of which the requesting host is a member, then the communications port an invalid port. If it is determined that the port is the valid port, then the request is serviced at operation 406. If it is determined that the port is not a valid port, then the request is denied.

Figure 4B:
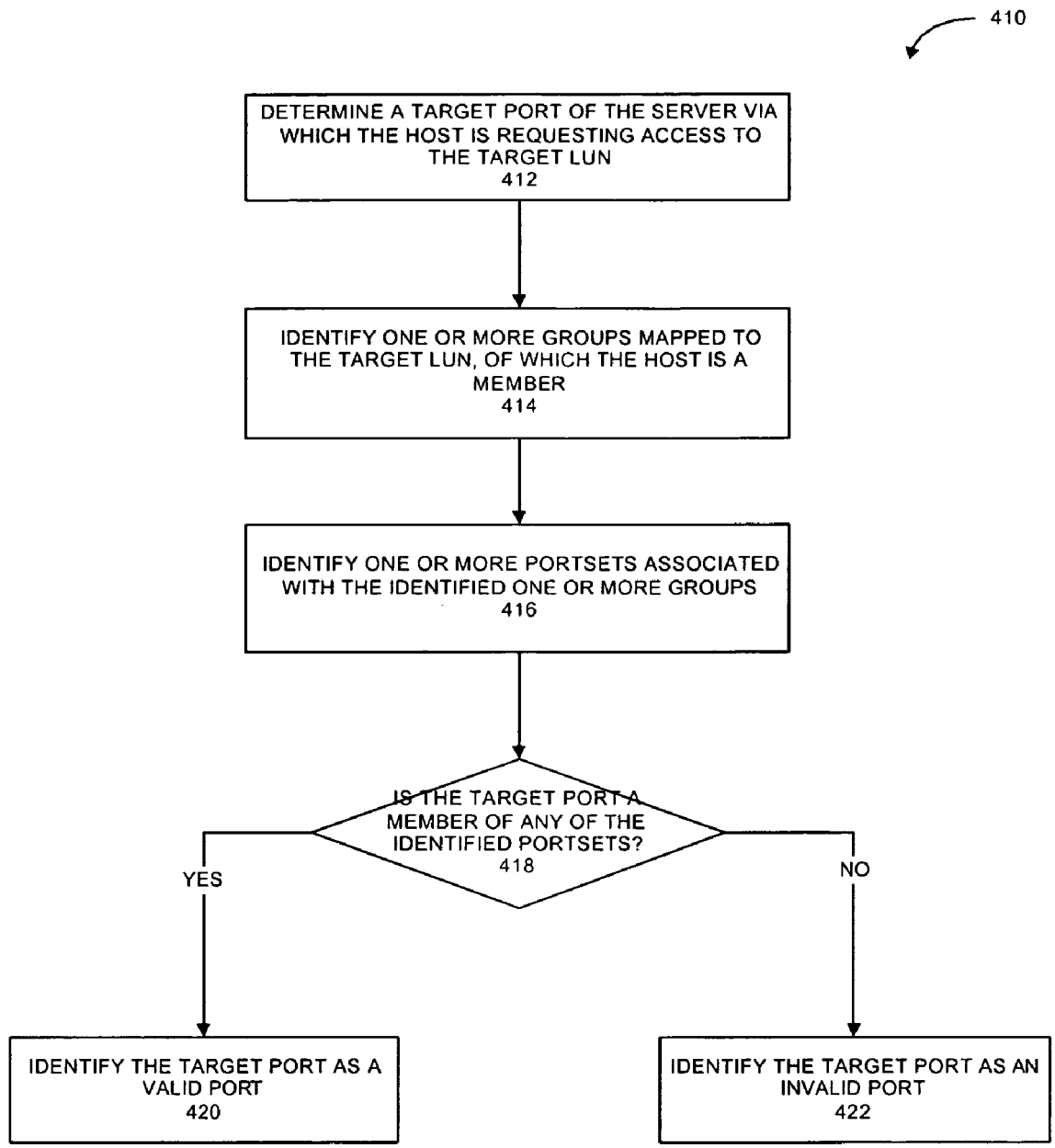
FIG. 4B is a flow chart illustrating a method to determine whether a communications port is a valid port, according to one embodiment of the present invention.

FIG. 4B illustrates a method 410 to determine whether a communications port is a valid port, according to one embodiment of the present invention. The method 400 may be performed by processing logic that may comprise hardware (e.g., dedicated logic, programmable logic, microcode, etc.), software (such as run on a general purpose computer system or a dedicated machine), or a combination of both.

Referring to FIG. 4B, once a request for access to the target LUN on the storage server is received at a network driver layer (e.g., at the FC driver layer 216 or the media access layer 210), the translation layer (e.g., the SCSI target module 270) determines, at operation 412, a target port of the storage server via which the request arrived to the server. At operation 414, the translation layer determines the requestor's initiator group membership and identifies portsets associated with initiator groups of which the requestor is a member at operation 416. If it is determined, at operation 418, that the target port is a member of at least one identified portset, the target port is determined to be valid (operation 420). Otherwise, the target port is identified as an invalid port at operation 422.

Figure 5:
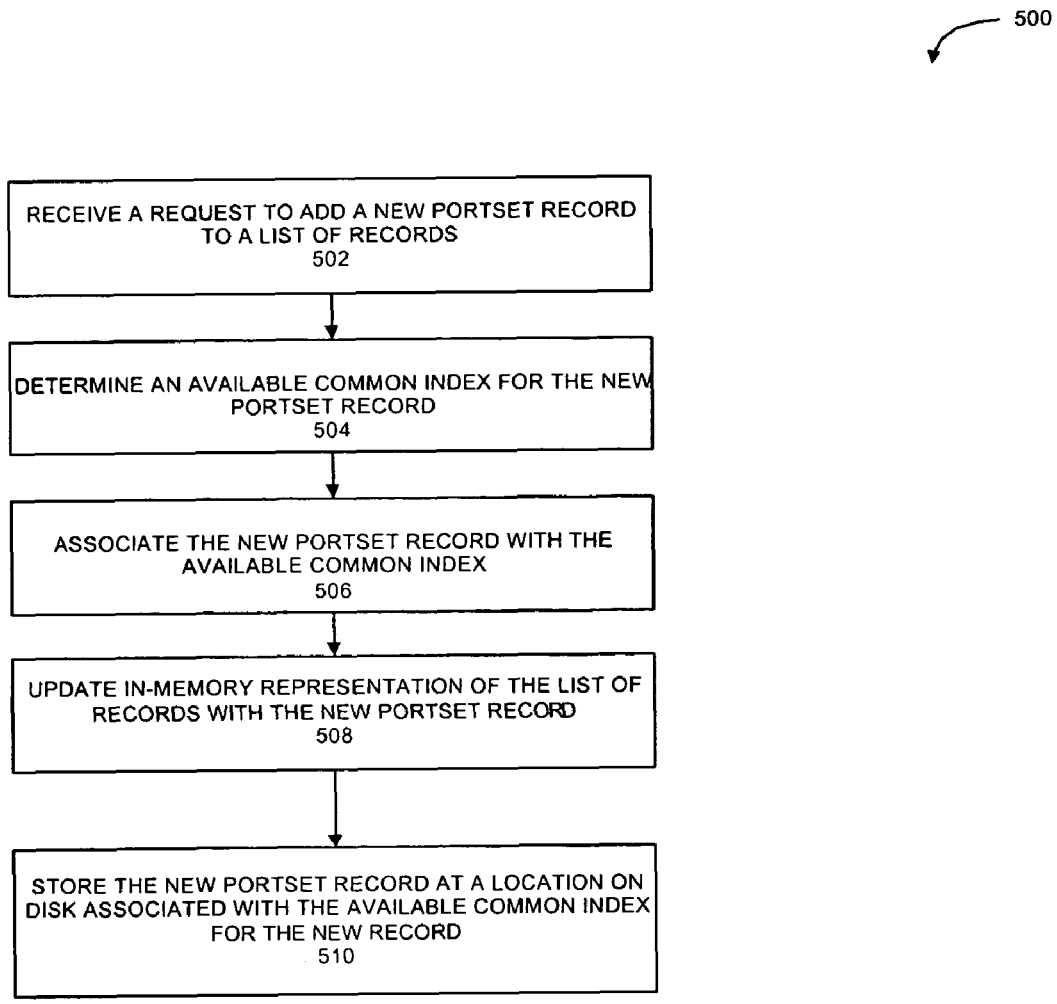
FIG. 5 is a flow chart illustrating a method for managing portset data, according to one embodiment the present invention.

FIG. 5 is a flow diagram illustrating a method 500 for managing portset data, according to one embodiment the present invention. The method 500 may be performed by processing logic that may comprise hardware (e.g., dedicated logic, programmable logic, microcode, etc.), software (such as run on a general purpose computer system or a dedicated machine), or a combination of both.

When a network drivers layer of the storage operating system 200 receives a request to add a new portset record to an existing list of portset records (block 502), the portset update component 294 first determines an available common index for the new portset record (block 504). The portset update component 294 then associates the new portset record with the determined available common index (block 506) and updates in memory representation of the list of records with the new portset record (block 508). The new record is then stored on disk at a location associated with the determined available common index (block 510).

Figure 6:
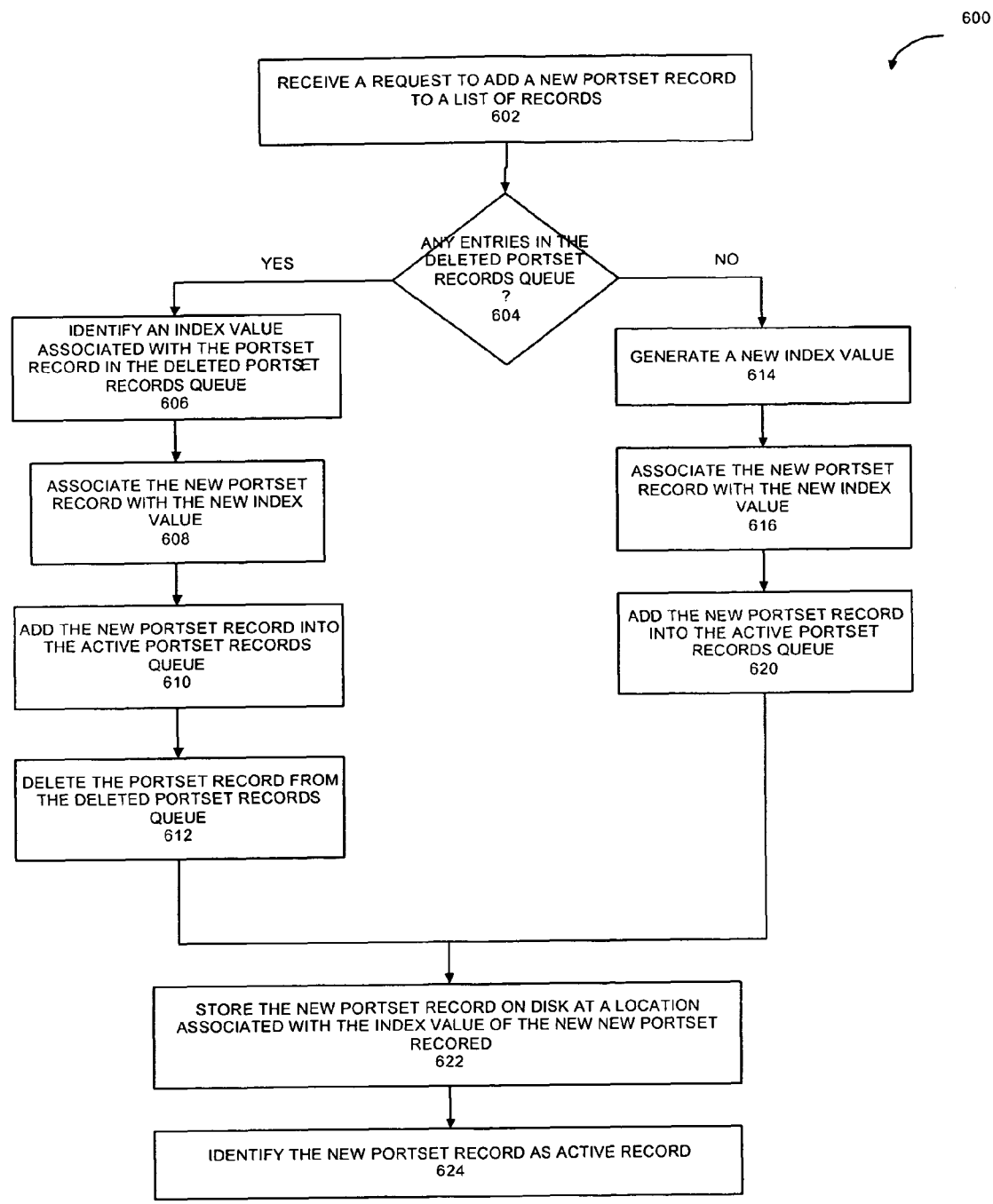
FIG. 6 is a flow chart illustrating a method for processing a request to add a new portset record, according to one embodiment the present invention.

FIG. 6 is a flow chart illustrating a method 600 for processing a request to add a new portset record and, specifically, a method to determine an available common index for the new portset record, according to one embodiment the present invention. The method 600 may be performed by processing logic that may comprise hardware (e.g., dedicated logic, programmable logic, microcode, etc.), software (such as run on a general purpose computer system or a dedicated machine), or a combination of both.

Responsive to a request to add a new portset record to an existing list of portset records (block 602), the portset update component 294 first determines whether there are any records present in the deleted portsets queue 298 (block 604). As mentioned above, the deleted portsets queue 298 may store portset records having index values that may be reused for newly added portset records. If a record is found in the deleted portsets queue 298, the portset update component 294 determines an index value associated with this record (block 606) and associates the new portset record with the determined index value (block 608). The portset update component 294 then adds the new portset record into the active portset records queue 296 (block 610). The record associated with the reused index value is then removed from the deleted portset records queue 298 (block 612).

If it is determined, at block 604, that there are no records present in the deleted portsets queue 298, the portset update component 294 may generate a new index value (block 614) and associate the new portset record with the newly generated index value (block 616). The portset update component 294 then adds the new portset record associated with the newly generated index value into the active portset records queue 296 (block 618).

When the new record is stored on disk at a location associated with the associated index value (block 620), the on disk representation of the new portset record is identified as active record (block 622). For example, the on disk representation of the new portset record may be marked with a VALID or ACTIVE flag. When a storage server is rebooted or powered up, the in memory representation of the portset records list is populated only with active portset records.

Figure 7:
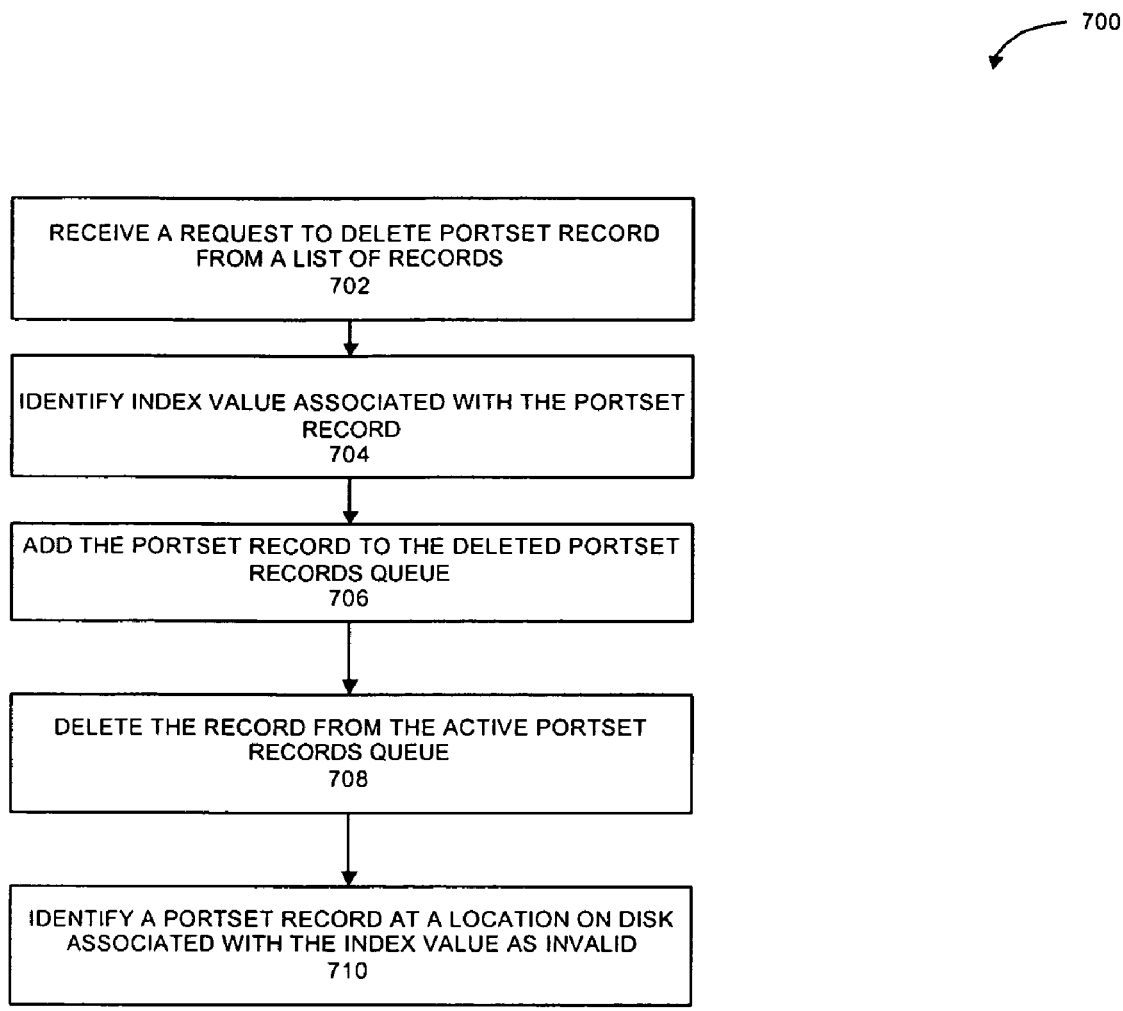
FIG. 7 is a flow chart illustrating a method for processing a request to delete a portset record, according to one embodiment the present invention.

FIG. 7 is a flow chart illustrating a method 700 for processing a request to delete a portset record, according to one embodiment the present invention. The method 500 may be performed by processing logic that may comprise hardware (e.g., dedicated logic, programmable logic, microcode, etc.), software (such as run on a general purpose computer system or a dedicated machine), or a combination of both.

At block 702, a network drivers layer of the storage operating system 200 receives a request to delete a portset record from the list of portset records. The portset update component 294 first determines the index value associated with the portset record that needs to be deleted (block 704). The portset update component 294 then adds the portset record that needs to be deleted into the deleted portset records queue 298 (block 706) to indicate that the index value associated with this record may be reused in the event a new portset record is being added. The record is then deleted from the active portset records queue 296 (708). The on disk representation of the deleted record is then marked with an INVALID flag (block 710), so that when a storage server is rebooted or powered up, the deleted record is not loaded into memory.

Thus, a method and system for portset data management have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

It will be understood by those skilled in the art that the inventive technique described herein may apply to any type of special-purpose (e.g., file server, filer or multi-protocol storage appliance) or general-purpose computer, including a standalone computer or portion thereof, embodied as or including a storage server 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. In one embodiment, the techniques to manage portset data described herein may be utilized in an environment, where a storage server has a distributed architecture. For example, where a storage server includes a separate N-("network") blade used to communicate with clients and D-(disk) blade to communicate with the storage subsystem. Where a storage server has a distributed architecture, both on disk and in memory data may be stored in distributed databases. The data may be read from the d-blade during boot time and populated into the in memory database that is kept on all the n-blades. In one embodiment, these databases may be visible to all n-blades that may require the information.

It will be noted that the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

What is claimed is:

1. A computer implemented method to synchronize in memory and on disk data, the method comprising:
   receiving, by a storage server, a request to add a new portset record to a list of portset records, the list of portset records stored on a disk and a representation of each record in the list of portset records stored in memory, wherein the disk is coupled to the storage server through an I/O interconnect, and wherein a portset is a set of ports that provides access to logical unit numbers (LUNs);
   locating a previously deleted record in a first queue in memory, the first queue being to store data associated with deleted records;
   determining an available entry in a common index by identifying an index value associated with the previously deleted record in the first queue, the index value to identify both a record stored on the disk and the corresponding representation of the record in memory;
   associating the new portset record with the available entry in the common index;
   adding the new portset record into a second queue in memory, the second queue being to store data associated with active portset records;
   deleting the located record from the first queue;
   identifying a location on disk associated with the available entry in the common index for the new record, wherein the location on disk was previously occupied by the previously deleted record; and
   updating data at the location on disk with the new portset record.

2. The method of claim 1, wherein updating data at the location on disk associated with the available entry in the common index for the new record comprises identifying the new portset record as active record.

3. The method of claim 2, further comprising:
   receiving a request to delete an old portset record from the list of portset records;
   removing the old portset record from the second queue;
   adding the old portset record into the first queue; and
   identifying the old on disk record as an invalid record.

4. The method of claim 3, further comprising:
   responsive to a boot operation, populating the second queue with those records from the on disk list of records identified as active records.

5. A storage system comprising:
   a mass storage device to store a list of portset records, the list of portset records stored on a disk and a representation of each record in the list of records stored in memory, wherein the disk is coupled to a storage server through an I/O interconnect, and wherein a portset is a set of ports that provides access to logical unit numbers (LUNs);
   a network drivers layer to receive a request to add a new portset record to the list of portset records;
   a first queue to store data associated with deleted records,
   a second queue to store data associated with active portset records; and
   a portset update component to:
      determine an available entry in a common index for the new portset record by locating a previously deleted record in the first queue and identifying an index value associated with the previously deleted record from the first queue, the index value to identify both a record stored on the disk and the corresponding representation of the record in memory,
      associate the new portset record with the available entry in the common index,
      update the in memory representation of the list of portset records with the new portset record,
      identify a location on disk associated with the available entry in the common index for the new portset record, wherein the location on disk was previously occupied by the previously deleted record, and
      update data at the location on disk with the new portset record.

6. The storage system of claim 5, wherein the portset update component is further to:
   delete the located previously deleted record from the first queue, subsequent to updating the in memory representation of the list of portset records with the new portset record.

7. The storage system of claim 5, wherein the portset update component is further to:
   add the new portset record into the second queue.

8. The storage system of claim 5, wherein the network drivers layer is further to:

receive a request to delete an old portset record from the list of portset records.

9. The storage system of claim 5, wherein portsets associated with portset records provide access to LUNs over Fibre Channel protocol.

10. The storage system of claim 8, wherein the portset update component, in response to the request to delete the old portset record from the list of portset records is to:
   remove the old portset record from the second queue;
   add the old portset record into the first queue; and
   identify the old on disk record as an invalid portset record.

11. A computer implemented method to synchronize in memory and on disk data, the method comprising:
   receiving, by a storage server, a request to add a new record to a list of records, the list of records stored on a disk and a representation of each record in the list of records stored in memory, wherein the disk is coupled to the storage server through an I/O interconnect;
   determining an available entry in a common index for the new record by locating a previously deleted record in a first queue in memory, the first queue to store data associated with deleted records, and identifying an index value associated with the previously deleted record in the first queue, the index value to identify both a record stored on the disk and the corresponding representation of the record in memory;
   associating the new record with the available entry in the common index;
   updating the in memory representation of the list of records with the new record;
   identifying a location on disk associated with the available entry in the common index for the new record, wherein the location on disk was previously occupied by the previously deleted record; and
   updating data at the location on disk with the new record.

12. The method of claim 11, wherein updating in memory representation of the list of records with the new record comprises:
   adding the new record into a second queue in memory, the second queue being to store data associated with active records.

13. The method of claim 11, further comprising deleting the record from the first queue.

14. The method of claim 11, further comprising:
   receiving a request to delete an old record from the list of records;
   removing the old record from a second queue, the second queue being to store data associated with active records;
   adding the old record into the first queue; and
   identifying the old on disk record as an invalid record.

15. The method of claim 11, wherein updating data at the location on disk associated with the available entry in the common index for the new record comprises identifying the new on disk record as an active record.

16. The method of claim 11, wherein each record from the list of records is associated with portset data, wherein a portset is a set of ports that provides access to logical unit numbers (LUNs).

17. The method of claim 12, further comprising:
   responsive to a boot operation, populating the second queue with those records from the on disk list of records identified as active records.

18. The method of claim 16, wherein the portset provides access to LUNs over Fibre Channel protocol.

19. The method of claim 16, wherein the portset provides access to LUNs over internet small computer system interface (iSCSI).

20. A machine-readable storage medium having stored thereon data representing sets of instructions which, when executed by a machine, cause the machine to:
   receive a request to add a new record to a list of records, the list of records stored on a disk and a representation of each record in the list of records stored in memory, wherein the disk is coupled to a storage server through an I/O interconnect;
   determine an available entry in a common index for the new record by locating a previously deleted record in a first queue in memory, the first queue to store data associated with deleted records, and identifying an index value associated with the previously deleted record in the first queue, the index value to identify both a record stored on the disk and the corresponding representation of the record in memory;
   associate the new record with the available entry in the common index;
   update the in memory representation of the list of records with the new record;
   identify a location on disk associated with the available entry in the common index for the new record, wherein the location on disk was previously occupied by the previously deleted record; and
   update data at the location on disk with the new record.

21. A computer implemented method, comprising:
   receiving, by a storage server, a request to add a new record to a list of records, wherein the list of records is stored on a disk and a representation of each record in the list of records is stored in memory, wherein the disk is coupled to the storage server through an I/O interconnect; and
   synchronizing the on-disk list of records and the in-memory representation of the list of records, by determining an available entry in a common index for the new record by locating a previously deleted record in a first queue in memory, the first queue to store data associated with deleted records and identifying an index value associated with the previously deleted record in the first queue, the index value to identify both an on-disk record and the corresponding in-memory representation of the record, and identifying an in-memory location and an on-disk location that are associated with the entry in the common index for the new record and updating data at the in-memory location and the on-disk location with the new record, wherein the in-memory location and the on-disk location were previously occupied by the previously deleted record.

22. A computer implemented method, comprising:
   receiving, by a storage server, a request to add a new record to a list of records, wherein the list of records is stored on-disk and a representation of each record in the list of records is stored in memory, wherein the disk is coupled to the storage server through an I/O interconnect;
   determining that a previously deleted record having an available common index value is listed in a deleted records queue, the common index value to identify both an on-disk record and the corresponding in-memory representation of the record;
   associating the new record with the available common index value;
   identifying a location on-disk associated with the available common index, wherein the location on-disk was previously occupied by the previously deleted record; and
   updating data at the location on-disk with the new record.

* * * * *